UNITED STATES PATENT OFFICE.

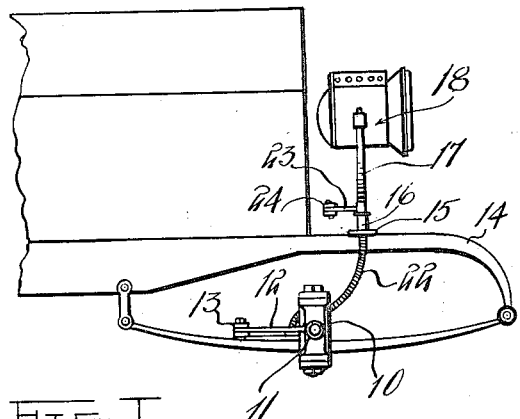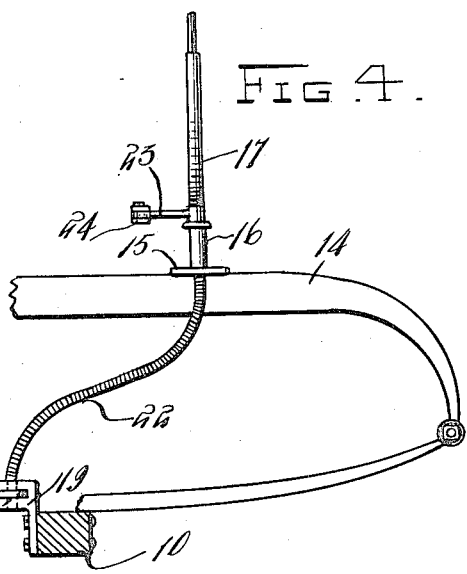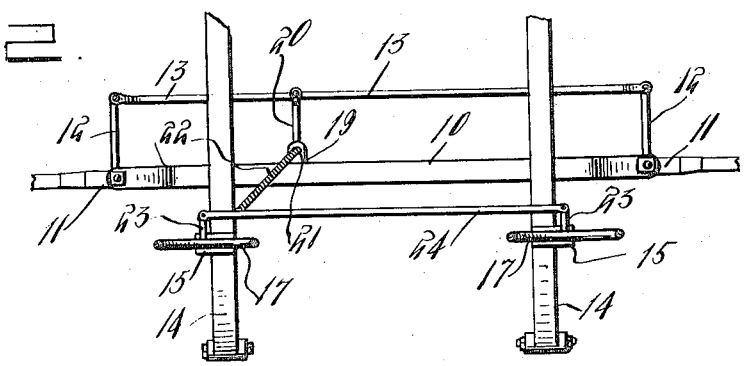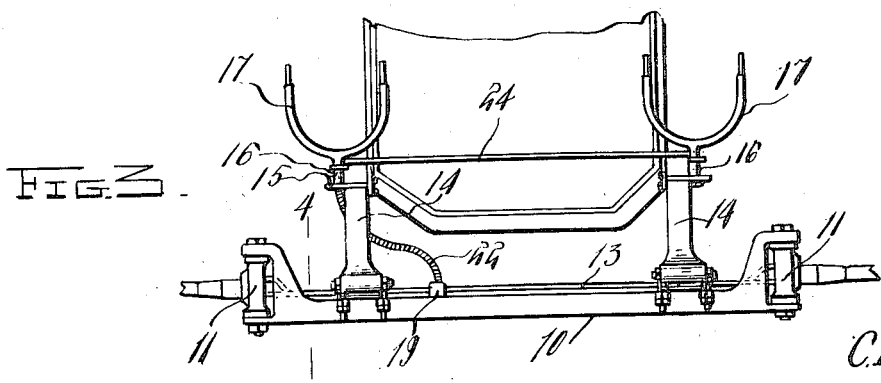

CLYDE B. SHERIDAN, OF EVERETT, WASHINGTON.

DIRIGIBLE AUTOMOBILE-LAMP.

1,137,672.

Specification of Letters Patent. Patented Apr. 27, 1915.

Application filed October 16, 1913. Serial No. 795,567.

*To all whom it may concern:*

Be it known that I, CLYDE B. SHERIDAN, a citizen of the United States, residing at Everett, in the county of Snohomish, State of Washington, have invented certain new and useful Improvements in Dirigible Automobile-Lamps; and I do hereby declare the following to be a full, clear, and exact description of the invention, such as will enable others skilled in the art to which it appertains to make and use the same.

This invention relates to improvements in automobile head lights, and particularly to dirigible head lights.

The principal object of the invention is to provide a simple mechanism for steering the head lights so that they will cast light directly ahead of the vehicle when making a turn.

Another object is to provide a steering device for automobile head lights in which rigid connection between the steering mechanism and the lamp brackets is done away with.

Other objects and advantages will be apparent from the following description, when taken in connection with the accompanying drawings.

In the drawings:—Figure 1 is a side elevation of the forward portion of an automobile, showing my invention applied thereto. Fig. 2 is a top plan view. Fig. 3 is a front elevation. Fig. 4 is a vertical section on the line 4—4 of Fig. 3.

Referring particularly to the accompanying drawings, 10 represents the front axle of the vehicle which is equipped with the usual steering stub axle 11 having the rearwardly extending arm 12 to which is connected the connecting rod 13 extending through the knuckle at the other end of the axle. Mounted on the forward end of each of the springs 14 is a bracket 15 which supports a rotating vertical post 16 provided with the usual forks 17 for supporting the lamp 18. Secured to the axle below one of the brackets 15 is a bracket 19, one end of a link 20 being pivotally connected to this bracket by means of a vertical pin 21, while the opposite end is pivotally connected to the beforementioned connecting rod 13. The lower end of the last mentioned post 16 is connected with the pin 21 by means of a flexible shaft 22, this post also carrying an arm 23 which is connected to a similar arm on the other post by means of a connecting rod 24. The connecting rod 13 is connected to the steering post in any well-known manner. (Not shown).

When the connecting rod is thrown to the right or left to swing the wheels of the vehicle, in the act of steering, the link 20 is moved so that it causes a rotation of the flexible shaft 22 and consequently the turning of the post 16 to which it is attached. This communicates motion to the other post 16 by means of a link 24, and accomplishes the turning of the lamp simultaneously with, and in the same direction as the wheels.

Particular attention is called to the flexible shaft 22, which does away with the usual rigid connection, and permits the ordinary operation or expansion and contraction of the springs 14 without straining any of the connecting parts of the steering mechanism or the lamp brackets.

What is claimed is:—

In a motor vehicle, the combination with a rotatably mounted lamp bracket, a transverse steering knuckle connecting rod, a bracket carried by the axle of the vehicle between the knuckles, an arm pivotally mounted in the bracket and pivotally connected to the said rod, and a flexible shaft connected at one end to the said lamp bracket post, and at its other end with the pivot of the said arm.

In testimony whereof, I affix my signature, in the presence of two witnesses.

CLYDE B. SHERIDAN.

Witnesses:
T. H. BOWDEN,
THURSTON HOLMQUIST.